United States Patent
Schroecker

(10) Patent No.: US 9,741,161 B2
(45) Date of Patent: Aug. 22, 2017

(54) METHOD, SYSTEM, AND MEDICAL IMAGING DEVICE FOR SHADING WITH MULTIPLE LIGHT SOURCES

(71) Applicant: General Electric Company, Schenectady, NY (US)

(72) Inventor: Gerald Schroecker, Salzburg (AT)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 14/468,742

(22) Filed: Aug. 26, 2014

(65) Prior Publication Data
US 2016/0063758 A1    Mar. 3, 2016

(51) Int. Cl.
| | |
|---|---|
| *G06T 15/80* | (2011.01) |
| *G06T 1/60* | (2006.01) |
| *G06T 15/08* | (2011.01) |
| *G06T 7/00* | (2017.01) |
| *G06F 17/30* | (2006.01) |

(52) U.S. Cl.
CPC .......... *G06T 15/80* (2013.01); *G06F 17/3028* (2013.01); *G06T 1/60* (2013.01); *G06T 7/0012* (2013.01); *G06T 15/08* (2013.01); *G06T 2210/41* (2013.01)

(58) Field of Classification Search
CPC ......... G06T 19/00; G06T 17/20; G06T 17/00; G06T 15/10; G06T 15/00; G06T 17/10; G06T 17/005; G06T 15/506; G06T 15/50; G06T 15/60; G06T 15/80; G06T 15/06
See application file for complete search history.

(56) References Cited

U.S. PATENT DOCUMENTS

| | | | |
|---|---|---|---|
| 7,301,538 B2 | 11/2007 | Buyanovskiy | |
| 7,441,923 B2* | 10/2008 | Hunerbein | F21V 21/40 323/905 |
| 7,466,849 B2 | 12/2008 | Haider et al. | |
| 9,245,375 B2* | 1/2016 | Genc | G06T 15/50 |
| 2007/0262983 A1* | 11/2007 | Choi | G06T 15/04 345/420 |
| 2010/0130812 A1* | 5/2010 | Martel | A61M 21/02 600/27 |

(Continued)

FOREIGN PATENT DOCUMENTS

EP    2752818 A2    7/2014

OTHER PUBLICATIONS

Halle M et al.: LightKit: A Lighting System for Effective Visualization, VIS 2003, IEEE Visualization 2003. Jan. 1, 2003, pp. 363-370.

(Continued)

*Primary Examiner* — Todd Buttram
(74) *Attorney, Agent, or Firm* — McCoy Russell LLP

(57) ABSTRACT

A method, system and medical imaging device include accessing a 3D medical imaging dataset and generating a volume-rendered image from the 3D medical imaging dataset. Generating the volume-rendered image includes calculating a shading for the volume-rendered image based on a first light source, a second light source, and a third light source. The second light source and the third light source are both positioned differently than the first light source. The method, system, and medical imaging device also include displaying the volume-rendered image.

20 Claims, 9 Drawing Sheets

(56) References Cited

U.S. PATENT DOCUMENTS

| | | | |
|---|---|---|---|
| 2011/0084628 A1* | 4/2011 | Welten | H05B 37/0254 |
| | | | 315/312 |
| 2012/0176365 A1* | 7/2012 | Hansegard | A61B 8/085 |
| | | | 345/419 |
| 2012/0189178 A1* | 7/2012 | Seong | G06T 11/008 |
| | | | 382/128 |
| 2013/0169641 A1 | 7/2013 | Schroecker | |
| 2014/0108053 A1 | 4/2014 | Akaki et al. | |
| 2015/0216019 A1* | 7/2015 | Verfuerth | H05B 37/0272 |
| | | | 315/153 |
| 2016/0292810 A1* | 10/2016 | Fine | G06F 9/50 |

OTHER PUBLICATIONS

Zhang Yubo et al.: :Lighting Design for Globally Illuminated Voulme Rendering, IEEE Transactions on Visualization and Computer Graphics, IEEE Service Center, Los Alamitos, CA, US, vol. 19, No. 12, Dec. 1, 2013, pp. 2946-2955.

Lei Wang et al.: Lighting system for Visual Perception Enhancement in vol. Rendering;, IEEE Transactions on Visualization and Computer Graphics, IEEE Service Center, Los Alamitos, CA, US, vol. 19, No. 1, Jan. 1, 2013, pp. 67-80.

Search Report and Written Opinion from Corresponding PCT application PCT/US2015/044007 dated Oct. 30, 2015; 12 pages.

* cited by examiner

| | r | θ | φ | Light type | Focus direction | Light collimation | Width of source | Color | Intensity |
|---|---|---|---|---|---|---|---|---|---|
| First light source | 10 | 315° | 45° | Fan | Center | 45° | 3 | White | 8 |
| Second light source | 12 | 45° | 25° | Fan | Center | 45° | 3 | Yellow | 4 |
| Third light source | 8 | 200° | 70° | Fan | Center | 45° | 1 | White | 3 |

METHOD, SYSTEM, AND MEDICAL IMAGING DEVICE FOR SHADING WITH MULTIPLE LIGHT SOURCES

FIELD OF THE INVENTION

This disclosure relates generally to a method, system, and medical imaging device for generating a volume-rendered image shaded with multiple light sources.

BACKGROUND OF THE INVENTION

Volume-rendered images are very useful for representing 3D medical imaging datasets. Volume-rendered images are typically 2D representations of a 3D medical imaging dataset. There are currently many different techniques for generating a volume-rendered image. One such technique, ray-casting, includes projecting a number of rays through the 3D medical imaging dataset. Each sample in the 3D medical imaging dataset is mapped to a color and a transparency. Data is accumulated along each of the rays. According to one common technique, the accumulated data along each of the rays is displayed as a pixel in the volume-rendered image. In order to gain an additional sense of depth and perspective, volume-rendered images are oftentimes shaded based on a light direction. Shading may be used in order to convey the relative positioning of structures or surfaces in the volume-rendered image. The shading helps a viewer to more easily visualize the three-dimensional shape of the object represented by the volume-rendered image.

Standard volume-rendering techniques typically calculate shadows for the volume-rendered image based on a single light source. This can lead to harsh shadows and/or overly bright regions on portions of the volume-rendered image that may be distracting to viewers. It would be desirable to retain the advantages of shading while reducing the harshness of the shadows. Additionally, it has become an increasingly common practice for parents to retain prenatal images as keepsakes, specifically in the ultrasound imaging modality. This practice has led to in increased demand for volume-rendered images that are qualitatively nicer to view and that are more similar to photographs in appearance.

Therefore, for these and other reasons, a system and method for generating volume-rendered images with multiple light sources is desired.

BRIEF DESCRIPTION OF THE INVENTION

The above-mentioned shortcomings, disadvantages and problems are addressed herein which will be understood by reading and understanding the following specification.

In an embodiment, a method of volume-rendering includes accessing a 3D medical imaging dataset and generating a volume-rendered image from the 3D medical imaging dataset. Generating the volume-rendered image comprises calculating a shading for the volume-rendered image based on a first light source, a second light source, and a third light source. The second light source and the third light source are both positioned differently than the first light source. The method includes displaying the volume-rendered image.

In another embodiment, a system for interacting with a 3D medical imaging dataset includes a display device, a user input, and a processor communicatively connected to the display device and the user input. The processor is configured to access a 3D medical imaging dataset. The processor is configured to generate a volume-rendered image from the 3D medical imaging dataset, where generating the volume-rendered image includes calculating a shading based on a first light source, a second light source, and a third light source. The second light source and the third light source are both distinct from the first light source. The processor is configured to display the volume-rendered image on the display device.

In another embodiment, a medical imaging device includes an acquisition subsystem, a display device, a memory, a user input, and a processor communicatively connected to the acquisition subsystem, the display device, the memory, and the user input. The processor is configured to control the acquisition subsystem to acquire a 3D medical imaging dataset. The processor is configured to generate a volume-rendered image from the 3D medical imaging dataset. Generating the volume-rendered image includes calculating a shading based on a first light source, a second light source, and a third light source. The second light source and the third light source are both distinct from the first light source. The processor is configured to display the volume-rendered image on the display device.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1A:
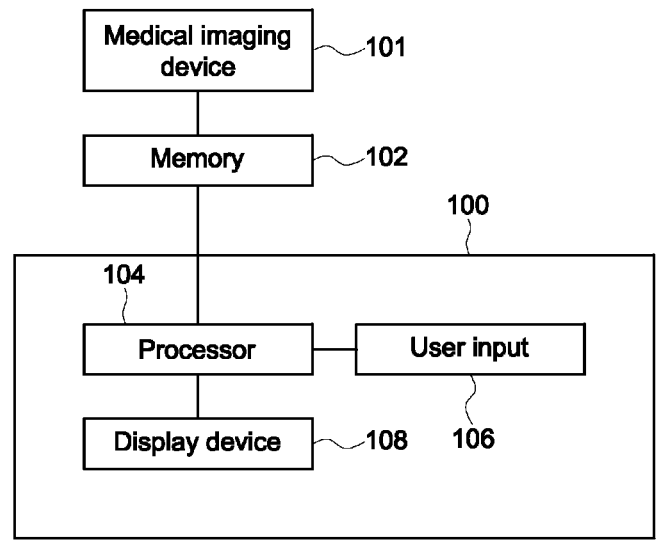
FIG. 1A is a schematic diagram of a system, a medical imaging device, and a memory in accordance with an embodiment.

FIG. 1A is a schematic diagram of a system 100, a medical imaging device 101, and a memory 102. The system 100 is adapted for interacting with a 3D medical imaging dataset according to an embodiment. The system 100 includes a processor 104, a user input 106, and a display device 108. The memory 102 may include any known medium for storing digital data, including, but not limited to a hard drive, a flash memory, random access memory (RAM), read only memory (ROM), a compact disc (CD), and a compact disc read-only memory (CD-ROM). The memory 102 may be part of a database, a component of a PACS/RIS system, or a stand-alone component. The medical imaging device 101 may comprise any type of medical imaging device capable of acquiring a 3D medical imaging dataset. For example, the medical imaging device 101 may be an ultrasound imaging system, a computed tomography (CT) imaging system, a magnetic resonance imaging (MRI) system, a nuclear medicine imaging system (SPECT), or a positron emission tomography (PET) imaging system according to various embodiments. The processor 104 is communicatively connected to the memory 102. This may be via either a wired or a wireless connection. The processor 104 may include one or more separate processing components. For example, the processor 104 may include a central processing unit (CPU), a microprocessor, a graphics processing unit (GPU), or any other electronic component capable of processing data according to specific logical instructions. Having a processor that includes a GPU may advantageous for computation-intensive operations, such as volume-rendering large 3D medical imaging datasets. According to some embodiments, the memory 102 may be co-located with the processor 104. However, according to other embodiments, the memory 102 may be remotely located with respect to the processor 104 and accessed through technologies including wireless networks, the internet, or an intranet.

A user input 106 is communicatively connected to the processor 104. The user input 106 may include a trackball and one or more buttons according to an exemplary embodiment. However, according to other embodiments, the user input 106 may include one or more of a mouse, a track pad, a touch screen, rotary controls, or an assortment of hard or soft keys with defined or definable functions. The user input 106 may comprise any other type of input device configured to allow the input of commands. The display device 108 is communicatively connected to the processor 104 as well. The display device 108 may include a monitor or display screen such as a monitor, an LCD screen, an LED screen, a projector, or any other device suitable for displaying a volume-rendered image. Other embodiments may include multiple display devices.

Figure 1B:
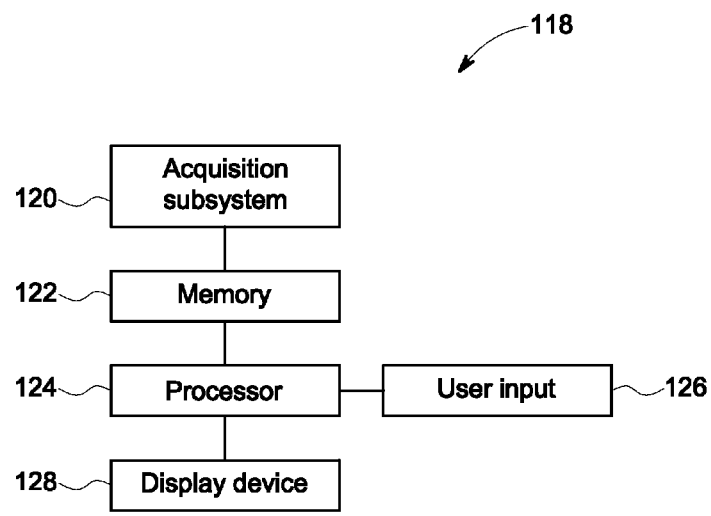
FIG. 1B is a schematic diagram of a medical imaging device in accordance with an embodiment.

FIG. 1B is a schematic representation of a medical imaging device 118 in accordance with an embodiment. The medical imaging device 118 includes an acquisition subsystem 120, a memory 122, a processor 124, a user input 126, and a display device 128. The processor 124 is communicatively connected to the display device 128, the memory 122, the acquisition subsystem 120, and the user input 126. The acquisition subsystem 120 may comprise one or more components adapted for acquiring a 3D medical imaging dataset. For example, the acquisition subsystem 120 may include transmission and receive components of an ultrasound imaging system, such as a transmitter, a transmit beamformer, a receiver, and a receive beamformer. The acquisition subsystem 120 of an ultrasound imaging system may also include probe with a plurality of transducer elements. The acquisition subsystem 120 may include an x-ray tube and a detector for a CT imaging system. The acquisition subsystem 120 may include a magnet, gradient coils, RF coils, and associated components for an MRI system. The acquisition subsystem 120 may additionally include any other components configured for acquiring 3D medical imaging datasets from a patient. The processor 124 may be configured to control the acquisition subsystem 120 based on commands entered through the user input 126.

The processor 124 may include one or more separate processing components. For example, the processor 104 may include a central processing unit (CPU), a microprocessor, a graphics processing unit (GPU), or any other electronic component capable of processing data according to specific logical instructions. The memory 122 may include any known medium for storing digital data, including, but not limited to a hard drive, a flash memory, random access memory (RAM), read only memory (ROM), a compact disc (CD), and a compact disc read-only memory (CD-ROM). The display device 128 may include a monitor or display screen such as a monitor, an LCD screen, an LED screen, a projector, or any other device suitable for displaying a volume-rendered image. Other embodiments may include multiple display devices. The user input 126 may include a trackball and one or more buttons according to an exemplary embodiment. However, according to other embodiments, the user input 106 may include one or more of a mouse, a track pad, a touch screen, rotary controls, or an assortment of hard or soft keys with defined or definable functions. The user input 126 may comprise any other type of input device configured to allow the input of commands.

The user input 126 is configured to receive commands from a user controlling the operation of the processor 124 which, in turn, controls the operation of the acquisition subsystem 120. The processor 124 controls the acquisition subsystem 120 to acquire one or more 3D medical imaging datasets. The processor 124 may then generate one or more volume-rendered images for display on the display device 128 based on the 3D medical imaging dataset. The generation of the volume-rendered images will be described in additional detail hereinafter.

Figure 2:
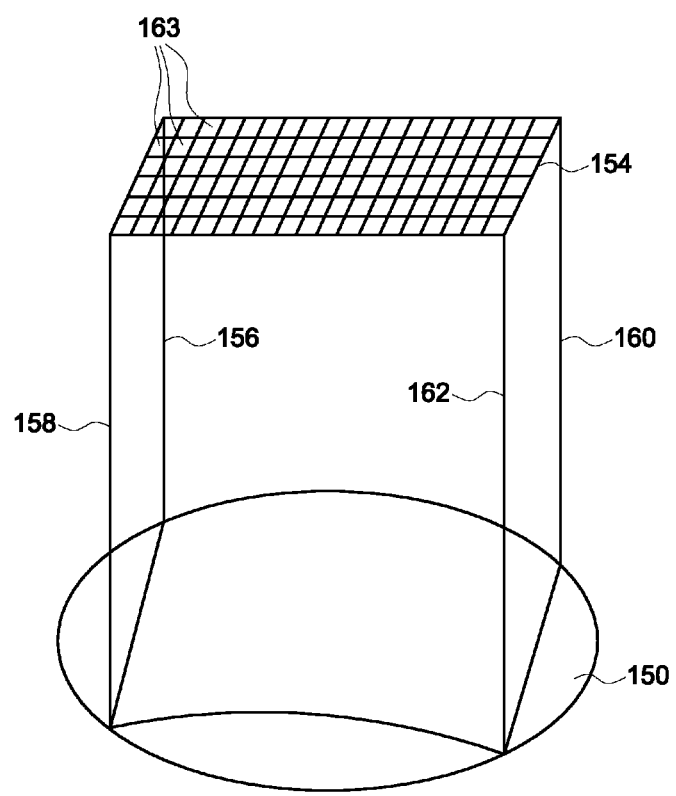
FIG. 2 is a schematic representation of a geometry that may be used to generate a volume-rendered image according to an embodiment.

FIG. 2 is a schematic representation of geometry that may be used to generate a volume-rendered image according to an embodiment. FIG. 2 includes a 3D medical imaging dataset 150 and a view plane 154.

Referring to both FIGS. 1A and 2, the processor 104 may generate a volume-rendered image according to a number of different techniques. According to an exemplary embodiment, the processor 104 may generate a volume-rendered image through a ray-casting technique from the view plane 154. The processor 104 may cast a plurality of parallel rays from the view plane 154 to or through the 3D medical imaging dataset 150. FIG. 2 shows a first ray 156, a second ray 158, a third ray 160, and a fourth ray 162 bounding the view plane 154. It should be appreciated that additional rays may be cast in order to assign values to all of the pixels 163 within the view plane 154. The 3D medical imaging dataset 150 may comprise voxel data, where each voxel, or volume-element, is assigned a value or intensity. Additionally, each voxel may be assigned an opacity as well. The value or intensity may be mapped to a color according to some embodiments. The processor 104 may use a "front-to-back" or a "back-to-front" technique for volume composition in order to assign a value to each pixel in the view plane 154 that is intersected by the ray. For example, starting at the front, that is the direction from which the image is viewed, the intensities of all the voxels along the corresponding ray may be summed. Then, optionally, the intensity may be multiplied by an opacity corresponding to the opacities of the voxels along the ray to generate an opacity-weighted value. These opacity-weighted values are then accumulated in a front-to-back or in a back-to-front direction along each of the rays. The process of accumulating values is repeated for each of the pixels 163 in the view plane 154 in order to generate a volume-rendered image. According to an embodiment, the pixel values from the view plane 154 may be displayed as the volume-rendered image. The volume-rendering algorithm may additionally be configured to use an opacity function providing a gradual transition from opacities of zero (completely transparent) to 1.0 (completely opaque). The volume-rendering algorithm may account for the opacities of the voxels along each of the rays when assigning a value to each of the pixels 163 in the view plane 154. For example, voxels with opacities close to 1.0 will block most of the contributions from voxels further along the ray, while voxels with opacities closer to zero will allow most of the contributions from voxels further along the ray. Additionally, when visualizing a surface, a thresholding operation may be performed where the opacities of voxels are reassigned based on the values. According to an exemplary thresholding operation, the opacities of voxels with values above the threshold may be set to 1.0 while voxels with the opacities of voxels with values below the threshold may be set to zero. Other types of thresholding schemes may also be used. An opacity function may be used to assign opacities other than zero and 1.0 to the voxels with values that are close to the threshold in a transition zone. This transition zone may be used to reduce artifacts that may occur when using a simple binary thresholding algorithm. For example, a linear function mapping opacities to values may be used to assign opacities to voxels with values in the transition zone. Other types of functions that progress from zero to 1.0 may also be used. Volume-rendering techniques other than the ones described above may also be used in order to generate a volume-rendered image from a 3D medical imaging dataset.

The volume-rendered image may be shaded in order to present the user with a better perception of depth. This may be performed in several different ways according to various embodiments. For example, a plurality of surfaces may be defined based on the volume-rendering of the 3D medical imaging dataset. According to an exemplary embodiment, a gradient may be calculated at each of the pixels. The processor 104 (shown in FIG. 1) may compute the amount of light at positions corresponding to each of the pixels and apply standard shading methods based on the gradients and specific light directions. The view direction may correspond with the view direction shown in FIG. 2. The processor 104 may also use multiple light sources as inputs when generating the volume-rendered image. For example, when ray casting, the processor 104 may calculate how much light is reflected, scattered, or transmitted from each voxel in a particular view direction along each ray. This may involve summing contributions from multiple light sources. The processor 104 may calculate the contributions from all the voxels in the volume. The processor 104 may then composite values from all of the voxels, or interpolated values from neighboring voxels, in order to compute the final value of the displayed pixel on the image. While the aforementioned example described an embodiment where the voxel values are integrated along rays, volume-rendered images may also be calculated according to other techniques such as using the highest value along each ray, using an average value along each ray, or using any other volume-rendering technique.

Figure 3:
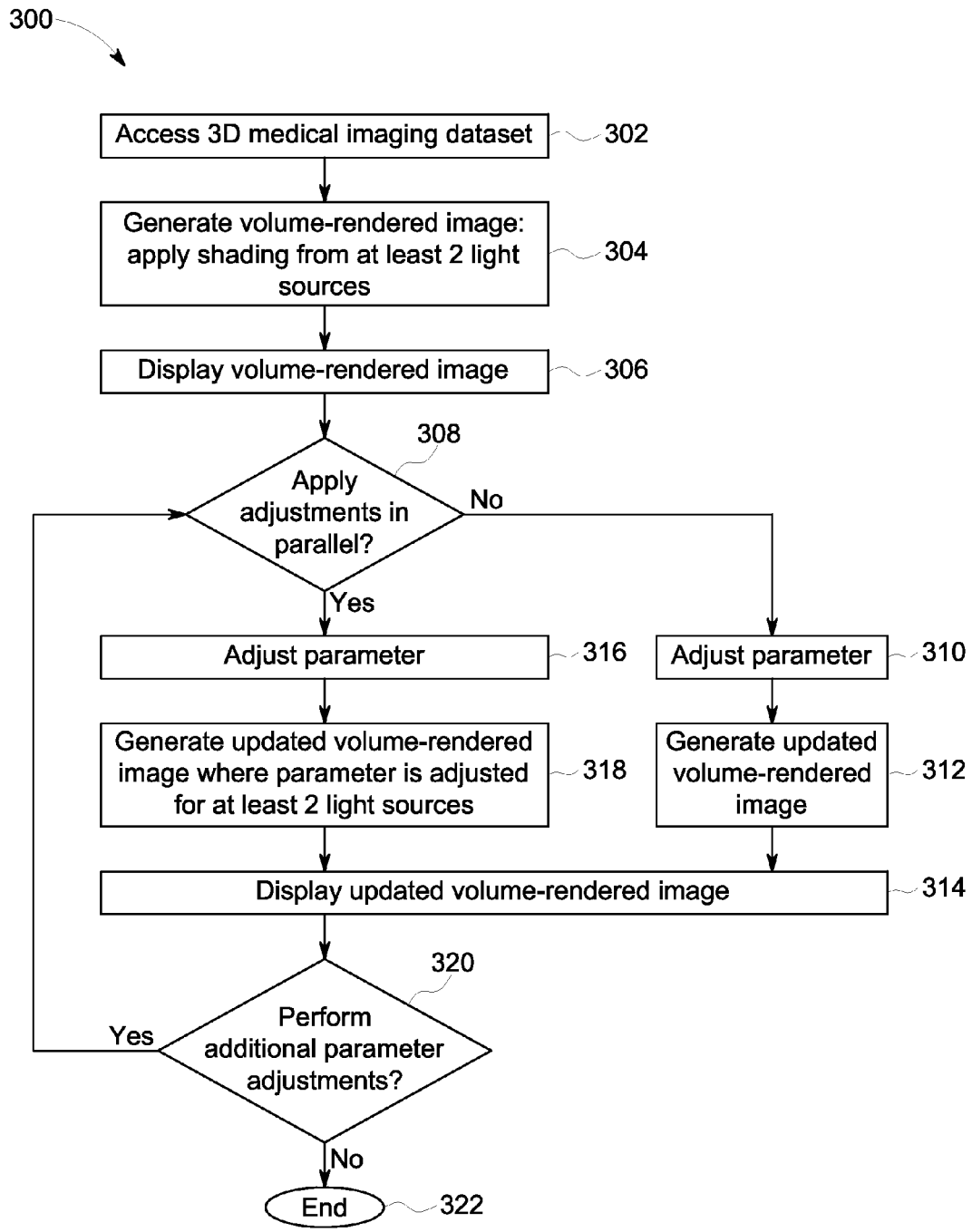
FIG. 3 is a flow chart of a method 300 in accordance with an embodiment.

FIG. 3 is a flow chart of a method 300 in accordance with an embodiment. According to exemplary embodiments, the method 300 may be performed with the system 100 shown in FIG. 1A or the medical imaging device 118 shown in FIG. 1B. The technical effect of the method 300 is the display of a volume-rendered image that is shaded from at least two different light sources. FIG. 3 will be described according to an exemplary embodiment where the method 300 is performed with the system 100 shown in FIG. 1A. However, according to other embodiments, the method 300 may also be performed with other systems or with medical imaging devices.

Referring to FIGS. 1A and 3, the medical imaging device 101 acquires a 3D medical imaging dataset and stores the medical imaging dataset in the memory 102. At step 302, the processor 104 accesses a 3D medical imaging dataset from a memory such as the memory 102.

The 3D medical imaging dataset may include voxel data where each voxel is assigned a value and an opacity. The value and opacity may correspond to the intensity of the voxel. At step 304, the processor 104 generates a volume-rendered image from the 3D medical imaging dataset. According to an embodiment, the processor 104 may generate the volume-rendered image according to one of the techniques previously described with respect to FIG. 2. As part of the generation of the volume-rendered image during step 304, the processor 104 determines the shading for the volume-rendered image. As described hereinabove with respect to FIG. 2, the shading of the volume-rendered image may include calculating how light from two or more distinct light sources would interact with the structures represented in the volume-rendered image. The algorithm controlling the shading may calculate how the light would reflect, refract, and diffuse based on intensities, opacities, and gradients in the 3D medical imaging dataset. The intensities, opacities, and gradients in the 3D medical imaging dataset may correspond with tissues, organs, and structures in the volume-of-interest from which the 3D medical imaging dataset was acquired. At step 304, the processor 104 uses the light from the multiple light sources in order to calculate the amount of light along each of the rays used to generate the volume-rendered image. The positions, orientations, and other parameters associated with the multiple lights sources will therefore directly affect the appearance of the volume-rendered image. In addition, the light sources may be used to calculate shading with respect to surfaces represented in the volume-rendered image.

Figure 4:
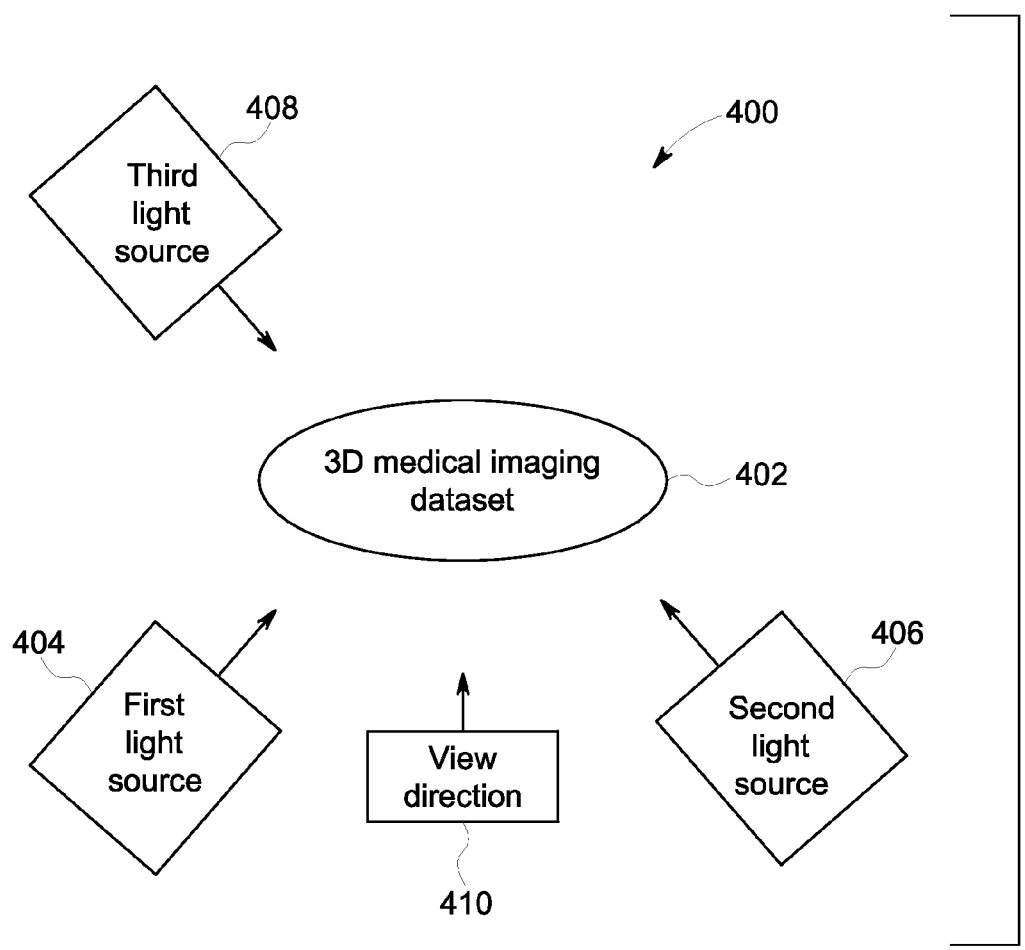
FIG. 4 is a schematic representation of an orientation of multiple light sources and a 3D medical imaging dataset in accordance with an embodiment.

FIG. 4 is a schematic representation of an orientation 400 of multiple light sources and a 3D medical imaging dataset 402 that may be used to apply shading to a volume-rendered image in accordance with an exemplary embodiment. FIG. 4 is an overhead view and it should be appreciated that other embodiments may use either fewer light sources or more light sources, and/or the light sources may be orientated differently with respect to the 3D medical imaging dataset 402. The orientation 400 includes a first light source 404, a second light source 406, and a third light source 408. The first light source 404, the second light source 406, and the third light source 408 are all used by the processor 104 to calculate shading for the volume-rendered image. However, as described previously, the light sources may also be used during a ray-casting process while generating the volume-rendering. The orientation 400 also includes a view direction 410 that represents the position from which the 3D medical imaging dataset 402 is viewed.

Figure 5:
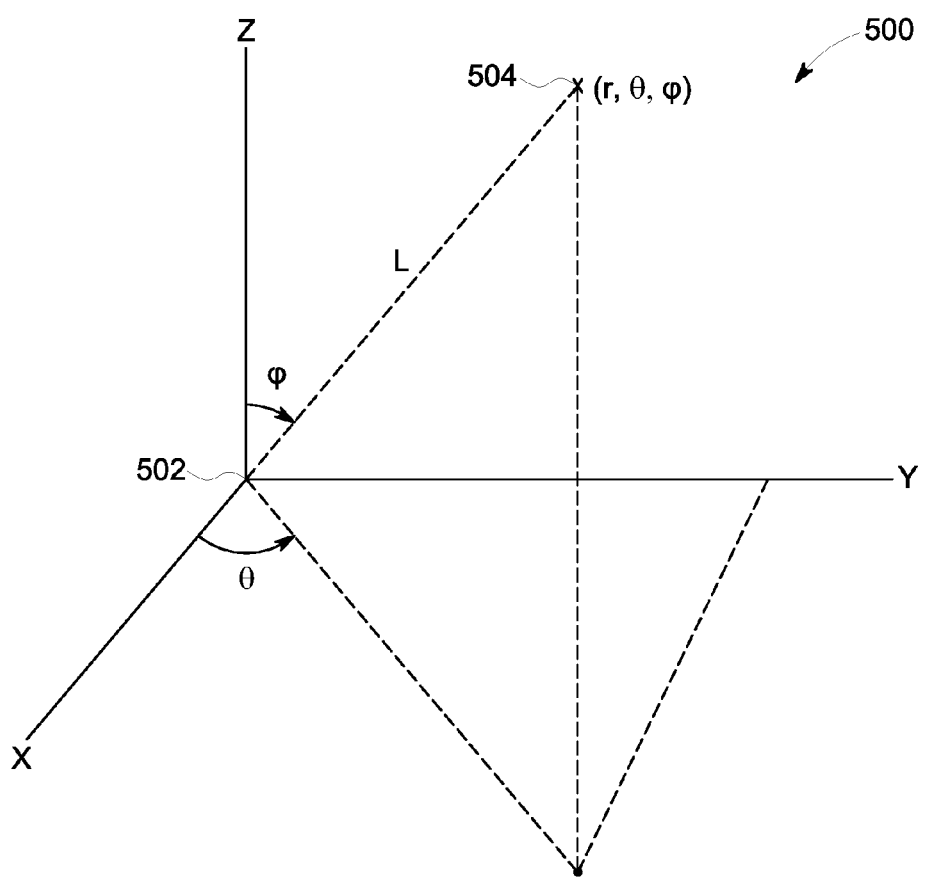
FIG. 5 is a schematic representation of a spherical coordinate system in accordance with an embodiment.

FIG. 4 represents an overhead view and it should be appreciated that each of the light sources may be positioned at a different height with respect to the 3D medical imaging dataset 402 and the view direction 410. FIG. 5 is a schematic representation of a spherical coordinate system 500 in accordance with an embodiment. The spherical coordinate system 500 may be used to describe the position and orientation for each of multiple light sources used to apply shading to a volume-rendered image. The spherical coordinate system 500 describes the location of each light source in terms of (r, θ, φ), where r represents a radial distance from an origin 502. The origin 502 may coincide with a geometric center of the 3D medical imaging dataset 402. A line segment L connecting the origin 502 and a point X 504 is shown in a dashed line. The angle θ represents an angular rotation of a projection of the line segment L onto the X-Y plane. The angle φ represents the angular rotation of the line segment L from the Z-axis. The spherical coordinate system 500 is an exemplary coordinate system and it should be appreciated that other coordinate systems may be used in accordance with other embodiments.

According to an embodiment, the three light sources shown in FIG. 4 may be configured in accordance with some of the principals established for three point lighting. For example, light sources including a key light, a fill light, and a back light, as used in cinema and photography, may be used. The key light may be the strongest light source used to illuminate the volume-rendering. The fill light may be positioned on the opposite side of the volume rendering as the key light with respect to the view direction 410 in order to reduce the harshness of the shadows from the key light. The back light may be positioned behind the 3D medical imaging dataset 402 with respect to the view direction 410. The back light may be used to help highlight and separate the 3D medical imaging dataset 402 from the background. The back light may be used to create a highlighted region, sometimes referred to as a "halo" around the top edges a volume-rendered image. The first light source 404 may be used as the key light and the second light source 406 shown in FIG. 4 may be used as a fill light. The first light source 404 may illuminate the volume-rendered image from either the left side or the right side from the reference of the view direction 410, while the second light source 406 illuminates the volume rendering 402 from the other of the left side and the right side. In FIG. 4, the first light source 404 illuminates the volume rendering 402 from the left side from the perspective of the view direction 410, while the second light source 406 illuminates the volume rendering 402 from the right side from the perspective of the view direction 410. The fill light is typically lower in intensity than the key light. Therefore, according to the embodiment shown in FIG. 4, the second light source 406 may be a lower intensity than the first light source 404. Additionally, it is generally desired to position the fill light at the same level or higher than the key light. According to an exemplary embodiment, both the first light source 404 and the second light source 406 may be oriented or aimed at a geometric center of the 3D medical imaging dataset 402. It is generally desirable to position the back light at a higher angle than either the key light or the fill light. The third light source 408 may be used as the back light according to the embodiment shown in FIG. 4. The back light may be directly behind the rendering 402, or the back light may be positioned to either side. In the exemplary embodiment shown in FIG. 4, the third light source 408 is positioned on the same side of the rendering 402 as the first light source 404.

According to an exemplary embodiment, the volume-rendered image that is displayed at step 306 may be shaded according to a three point lighting scheme established based on a preset configuration. The preset configuration may be a default configuration or it may be user configurable. According to one exemplary embodiment, the present configuration may be the three-point lighting orientation schematically represented in FIG. 4. It should be appreciated that the preset configuration may be any other arrangement as well depending upon the preferences of the user or the system configuration.

Next, at step 308, the user or the processor 104 determines if adjustments should be applied to the light sources individually or in parallel. The user may, for instance, adjust a setting on the system 100 through the user input 106 to select if particular parameters should be adjusted in parallel. According to other embodiments, the user input 106 may include an option for controlling each parameter individually, and an option for applying adjustments to one or more parameters in parallel.

Figure 6:
FIG. 6 is a table showing an exemplary list of parameters that may be adjusted according to an embodiment.

If, at step 308, the user decides not to adjust the parameters in parallel, the method 300 advances to step 310. At step 310, a user adjusts a parameter for one of the light sources. FIG. 6 is a table 600 showing an exemplary list of parameters that may be adjusted according to an embodiment. It should be appreciated that the parameters shown in the table 600 represent a non-limiting list and that the values shown for each parameter are merely exemplary.

Table 600 includes the first light source, the second light source, and the third light source. Each light source is listed on a different row. Exemplary parameters associated with each light source are shown in a separate column. The listed parameters include r, θ, and φ to describe the position of each light source in spherical coordinates. These parameters were described previously. The parameters in table 600 include a light type, a focus direction, a light collimation, a width at the source, a color and an intensity. The light type may be selected from a list of light types including a spot light, a point light, a parallel light, and an area light. A spot light may point in a direction and only illuminate objects within a cone, a point light shines from a location equally in all directions, a parallel light, also commonly referred to as a directional light, is placed infinitely far from the object and all the light beams are parallel, and an area light casts light from one side of a rectangular area of a plane. These are just exemplary light types and other light types may be used in accordance with additional embodiments. The light type may include a dispersion pattern of the light beams. The focus direction indicates where each of the light sources is aimed. The default may be towards the center of the 3D medical imaging dataset 402, but, according to an embodiment, each of the light sources may be individually aimed. Light collimation is an angle of light emitted from each of the light sources; width at the source is a width of each light source; color is the color or hue of the light emitted; and intensity is the brightness of each source. The values shown in table 600 are meant to be exemplary and are in no way limiting to the range of acceptable parameter values for each of the light sources. Other parameters that may be adjusted include range, shadow type, width of a falloff region, a type of falloff, and shape of an area light. For example, the range indicates how far light is emitted from the light source. Shadow type may indicate if the shadows are hard or soft shadows. The width of the falloff region indicates the width of a transition region between a bright inner portion, such as a cone of light, and the relatively dark region outside the cone. Additionally, the type of falloff may be used to describe the transition in the falloff region. For example, the falloff may be described by a mathematical relationship such as linear, Gaussian, exponential, or sigmoid.

Referring back to FIG. 3, at step 310 the user may independently adjust a parameter for each light source. Next, at step 312, the processor 104 generates an updated volume-rendered image based on the adjusted parameter settings from step 310 for any one of the light sources. At step 314, the processor 104 displays the updated volume-rendered image on the display device 108.

If, at step 320, the user would like to perform additional parameter adjustments, the method 300 returns to step 308. If it is not desired to perform additional parameter adjustments, the method 300 ends at step 322.

If, at step 308, the user or processor 104 determines to apply adjustments in parallel, the method advances to step 316. At step 316, the user may adjust a parameter for at least two light sources based on a single control input entered through the user input 106. The single control input may include a command entered through the user input 106 to adjust a value of the parameter. The processor 104 then adjusts the parameter in multiple light sources based on the single control input.

For example, according to an embodiment, the positions of two or more light sources may be adjusted in lock-step in order to maintain a fixed relative positioning between the two or more light sources. For purposed of this disclosure, the term "lock-step" is defined to include maintaining a relative positioning between two or more light sources as the positions of the light sources are adjusted. For example, the user may adjust the position of one of the light sources through a single control input, and the processor 104 may automatically adjust the position of one or more additional lights sources to maintain a fixed relative positioning between the light sources. The idea of maintaining a fixed relative positioning will be described additionally with respect to FIG. 7.

Figure 7:
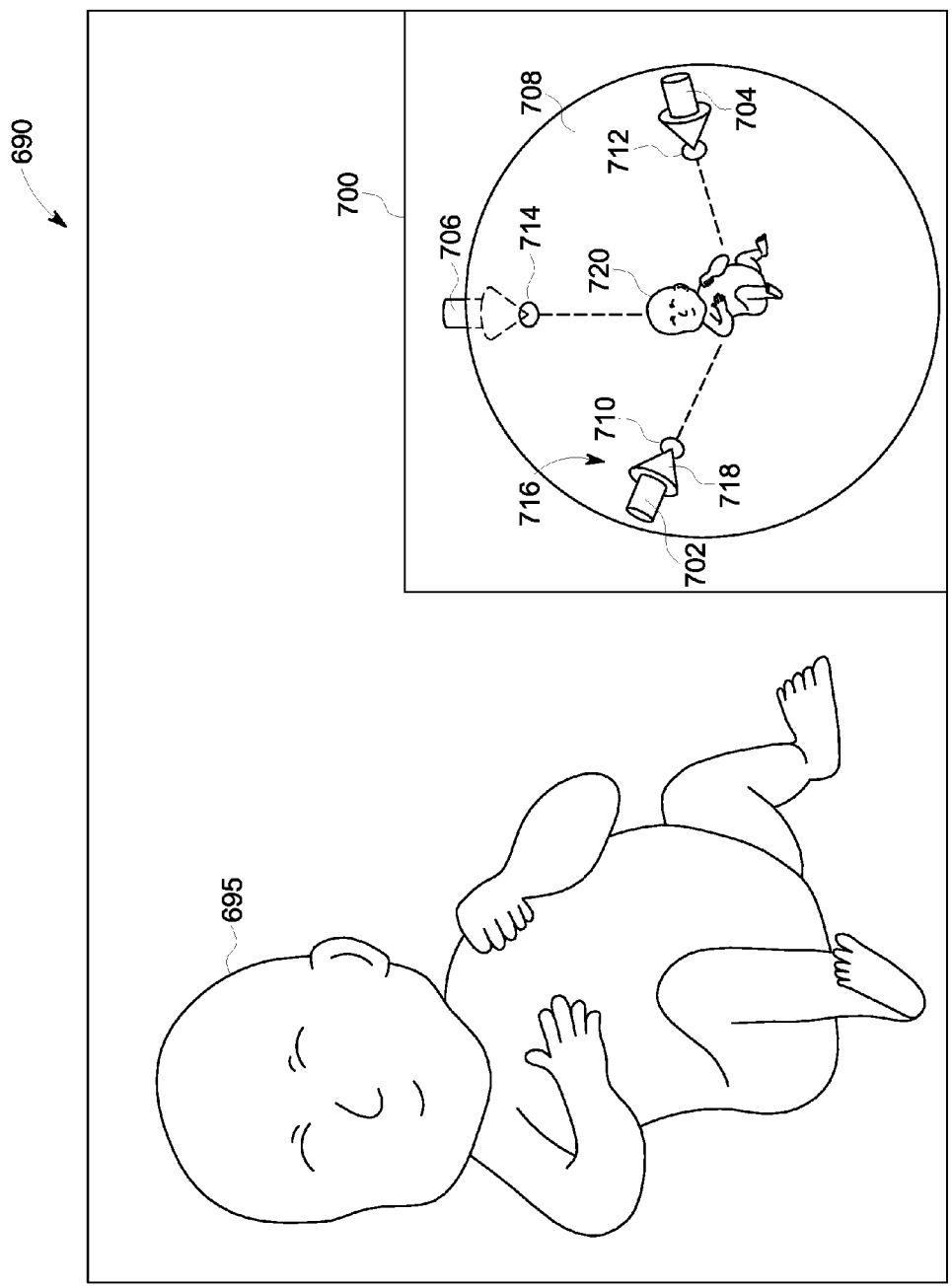
FIG. 7 is a schematic representation of a volume-rendered image and a light navigator in accordance with an embodiment.

FIG. 7 is a schematic representation of a volume-rendered image 695 and a light navigator 700 showing the relative positioning of multiple light sources in accordance with an embodiment. The light navigator 700 is one example of a representation that may be used to show the positioning of the light sources with respect to the volume-rendering. The light navigator 700 includes a first light direction indicator 702, a second light direction indicator 704, a third light direction indicator 706, and a scale volume-rendering 720. The light navigator 700 may be displayed at the same time as the volume-rendered image 695 to allow the user to easily see where the light sources are positioned with respect to the scale volume-rendering 720. The light navigator 700 may also include a model of a solid 708. The model of the solid 708 may be a sphere according to an exemplary embodiment, but other embodiments may different geometric shapes for the model of the solid 708. For example, the model of the solid may comprise a cube, a block, an oval, or any other geometric shape in other embodiments. The light navigator 700 also includes a first highlight 710, a second highlight 712 and a third highlight 714. Each of the highlights may show an area of increased reflectivity on the model of the solid 708 due to illumination of the model of the solid 708 from the light direction indicators. The model of the solid 708 may be either transparent or semi-transparent according to various embodiments. For purposes of this disclosure, the term "light navigator" is defined to include the combination of one or more light direction indicators and a model of a solid. The scale volume-rendering 720 may be a smaller version of the volume-rendered image 695. The embodiment shown in FIG. 7 includes three light direction indicators, but it should be appreciated that a different number of light direction indicators may be used on light navigators in accordance with other embodiments. The scale volume-rendering 720 may be shaded in the same manner as the volume-rendered image 695. According to other embodiments, the light navigator may not include the scale volume-rendering 720.

The user may use the user input 106 to control the positions of the light direction indicators (702, 704, and 706). For example, the user may select one of the light direction indicators and then reposition that light direction indicator and/or adjust any of the other parameters associated with the light source represented by that particular light direction indicator. Additionally, as will be discussed in detail hereinafter, the user may use control inputs from the user input 106 to control parameters for multiple light sources in parallel.

Figure 8:
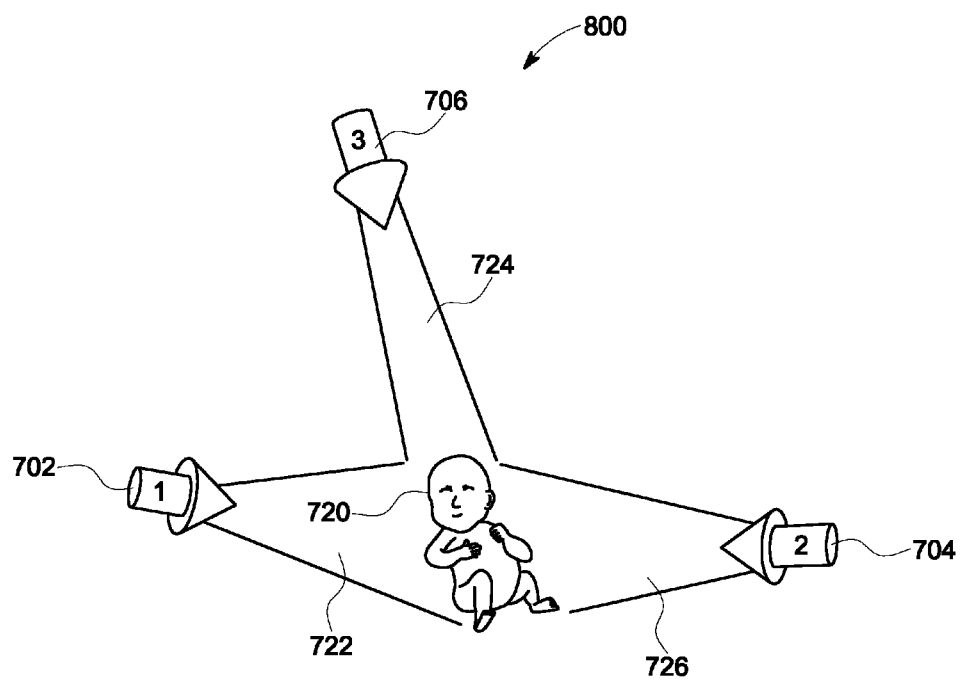
FIG. 8 is a schematic representation of a first light source, a second light source, and a third light source with respect to a volume-rendering.

FIG. 8 is a schematic representation of a first light direction indicator 702, a second light direction indicator 704, and a third light direction indicator 706 positioned with respect to a scale volume-rendering 720. FIG. 8 may is one example of a representation that may be displayed on the display device to represent the positioning of multiple light sources with respect to the volume-rendered image.

The light direction indicators (702, 704, 706) may be modified to indicate other parameters such as intensity, color, or light type, just to name a few. For example, a size of a light direction indicator may be adjusted to show the intensity of the light. A color of the light direction indicator may be adjusted to show the color of the light source represented by the light direction indicator. Additionally, a representation of a light beam may be positioned with each light direction indicator to show the type of light beam emitted by the light source. FIG. 8 includes a first representation of a light beam 722, a second representation of a light beam 724, and a third representation of a light beam 726. The user may also adjust any other parameter for multiple light sources with a single control input. For instance, the user may adjust the distance r of multiple light sources from the volume-rendering. If the light sources are at different distances from the volume-rendering, the processor 104 may automatically maintain the same relative distances from the volume-rendering. The user may adjust the light type of multiple light sources based on a single control input. The user may adjust the hues or intensities based on a single control input. The table 600 includes an intensity of 8 for the first light source, an intensity of 4 for the second light source, and an intensity of 3 for the third light source according to an exemplary embodiment where the intensities are measured on a scale of 1 to 10. The processor 104 may maintain the same relative intensities for the light sources as the user adjusts the intensities higher or lower. For example, the processor 104 may adjust the first light source and the second light source in parallel so that the second light source is always 50% of the intensity of the first light source. Likewise, the processor 104 may maintain the same relative intensity between the third light source and both the first light source and the second light source. Or, the processor 104 may maintain the same offset in intensities between the first light source, the second light source and the third light source as the intensities are adjusted in parallel. According to the embodiment show in table 600, the processor may maintain a difference of 4 between the intensities of the first light source and the second light source, and a difference of 5 between the first light source and the third light source. These are just a few examples of ways that parameters of multiple light sources may be adjusted in parallel based on a single control input. Parameters may be adjusted for multiple light sources in different manners according to other embodiments. Additionally, some of the parameters for the multiple light sources may be adjusted based on a single control input (i.e. adjusted in parallel), while other parameters may be individually controlled for each of the light sources. Or, as shown in the method 300 in FIG. 3, the user may determine whether or not to adjust parameters in parallel or independently each time that an adjustment is made. For example, the user may have the option to apply each adjustment based on a single control input to only one light source or to multiple light sources. According to other embodiments, the user may not have the option to adjust the parameters in parallel.

At step 318, the processor 104 generates an updated volume-rendered image where a parameter is adjusted for at least two of the light sources.

The light direction indicators (702, 704, 706) indicate the light directions used to shade the volume-rendered image. Each light direction indicator may include a representation of a polygonal model that is directional or shaped so that a user can clearly identify one end from an opposite end. Each light direction indicator may be a directional model used to clearly indicate a direction of the light used to shade a volume-rendered image. According to the embodiment shown in FIG. 8, the light direction indicator is a directional model that includes an arrow 716 with an arrow head 718. The light direction indicators may be other shapes according to additional embodiments.

Figure 9:
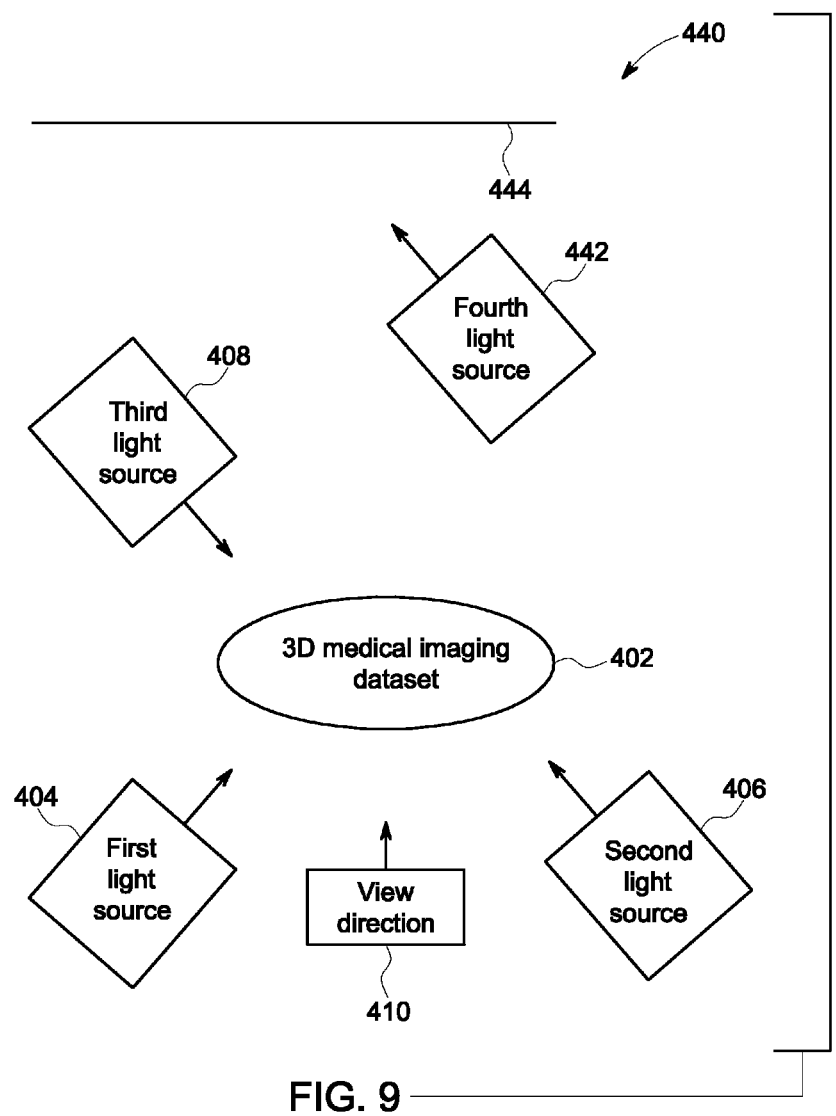
FIG. 9 is a schematic representation of an orientation of multiple light sources and a 3D medical imaging dataset in accordance with an embodiment.

As described previously, embodiments may include more than three light sources. For example, FIG. 9 is a schematic representation of an orientation 440 of four light sources and a 3D medical imaging dataset in accordance with an embodiment. Common reference numbers are used between FIGS. 4 and 9 in order to indicate common elements. The orientation 440 includes the 3D medical imaging dataset 402, the first light source 404, the second light source 406, the third light source 408, and the view direction 410. These elements may be oriented in approximately the same relative orientation to each other as was described with respect to FIG. 4 in accordance with an embodiment. However, it should be appreciated that the positions of the first light source 402, the second light source 406, and the third light source 408 may be adjusted with respect to the 3D medical imaging dataset 402. The orientation 440 also includes a fourth light source 442. According to an exemplary embodiment, the fourth light source 442 may be a background light. For instance, the fourth light source 442 may be aimed at a background 444. Light from the fourth light source 442 may reflect off the background 444 and provide additional lighting effects to the volume-rendered image generated from the 3D medical imaging dataset 402. It should be appreciated that according to other embodiments, the fourth light source 442 may be positioned differently with respect to the other light sources and the 3D medical imaging dataset 402. Additionally, instead of using a background such as the background 444, the fourth light source 442 may be aimed directly towards the 3D medical imaging dataset 402. For embodiments without a background 444, it may be desirable to adjust the fourth light source 442 so that it is more diffuse than the other light sources in order to simulate the light that would be reflected from the background 444. The orientation 440 is shown in accordance with the principles of four point lighting, but it should be appreciated that the individual positions and parameters of each light source may be adjusted according to other embodiments. Additionally, other embodiments may use more than four light sources.

The 3D medical imaging dataset may be acquired from any type of medical imaging device, but according to an exemplary embodiment, the 3D medical imaging dataset may be an ultrasound dataset acquired from an ultrasound imaging system. Additionally, the volume-rendered image may be of any anatomical structure, but according to an exemplary embodiment, the 3D medical imaging dataset may be acquired from at least a portion of a fetus.

The invention, embodiments of which have been described hereinabove, is advantageous because shading a volume-rendering with multiple light sources allows for the generation of a more visually pleasing volume-rendered image. The resulting volume-rendered image may use light direction and shading to more clearly define contours and shapes of the volume-rendered image with lighting in an arrangement that is consistent with the lighting used for studio photography and cinematography. As such, the volume-rendered image will appear more refined and of higher subjective quality, while accurately conveying all the information needed for a quick and accurate diagnosis.

Embodiments of this invention also allow for the use to have great flexibility in controlling the lighting, and hence the shading, of volume-rendered images. By allowing individual control of each parameter associated with each of multiple light sources, the user is granted complete flexibility over the shading of the resulting volume-rendered images. Additionally, by allowing the user to control light parameters in parallel, the user is able to quickly apply changes to the entire lighting scheme. Collectively, these embodiments enable the user to efficiently reach the desired lighting orientation for a volume-rendered image.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of volume-rendering comprising:
   accessing, via a processor, a 3D medical imaging dataset;
   generating, via the processor, a volume-rendered image from the 3D medical imaging dataset, the volume-rendered image generated from a first view direction and where generating the volume-rendered image comprises calculating and applying a shading for the volume-rendered image based on a first light source, a second light source, and a third light source, where the second light source and the third light source are both positioned differently than the first light source;
   displaying the volume-rendered image on a display device;
   responsive to user selection of a parallel adjustment mode:
      adjusting, via the processor, a position of both the first light source and the second light source based on a single control input;
      generating, via the processor, a first updated volume-rendered image from the first view direction after adjusting the position, where generating the first updated volume-rendered image comprises calculating and applying an updated shading based on the adjusted first light source, adjusted second light source, and third light source; and displaying the first updated volume-rendered image on the display device; and responsive to user selection of an individual adjustment mode:

only adjusting, via the processor, a position of the first light source based on another single control input;

generating, via the processor, a second updated volume-rendered image from the first view direction after adjusting the position, where generating the second updated volume-rendered image comprises calculating and applying an updated shading based on the adjusted first light source; and displaying the second updated volume-rendered image on the display device.

2. The method of claim 1, wherein the volume-rendered image is generated according to a ray-casting process using light from the first light source, the second light source, and the third light source, and further comprising adjusting a parameter for both the first light source and second light source, wherein the parameter is selected from a group consisting of: a direction, an intensity, a color, and a light type.

3. The method of claim 1, wherein the position of the first light source is adjusted in lock-step with the position of the second light source to maintain a fixed relative positioning between the first light source and the second light source.

4. The method of claim 1, wherein the first light source comprises a higher intensity than the second light source.

5. The method of claim 1, further comprising adjusting a parameter for the first light source, the second light source, and the third light source based on the single control input.

6. The method of claim 1, wherein the first light source comprises a key light, the second light source comprises a fill light, and the third light source comprises a back light, and further comprising a fourth light source, the fourth light source being more diffuse than the first light source, the second light source, and the third light source to simulate light that would be reflected from a background.

7. The method of claim 1, wherein adjusting the position of the first light source and second light source based on the single control input comprises adjusting the position of the first light source, the position of the second light source, and a position of the third light source by moving the first light source, the second light source, and the third light source in lock-step to maintain a fixed relative positioning between the first light source, the second light source, and the third light source.

8. The method of claim 1, wherein the 3D medical imaging dataset comprises an ultrasound dataset.

9. The method of claim 8, wherein generating the volume-rendered image from the ultrasound dataset comprises performing ray-casting from the first view direction, defining one or more surfaces represented in the volume-rendered image using a thresholding operation, and calculating the shading with respect to the one or more surfaces.

10. A system for interacting with a 3D medical imaging dataset comprising:
a display device;
a user input; and
a processor communicatively connected to the display device and the user input, wherein the processor is configured to:
access a 3D medical imaging dataset;
generate a 2D volume-rendered image from the 3D medical imaging dataset, where generating the 2D volume-rendered image comprises calculating a shading based on a first light source, a second light source, and a third light source, where the second light source and the third light source are both distinct from the first light source, wherein the first light source, second light source, and third light source each have a respective position relative to the 2D volume-rendered image, and wherein the first light source has a first light type, the second light source has a second light type, and the third light source has a third light type;
display the 2D volume-rendered image on the display device;
adjust the respective position of both the first light source and the second light source relative to the 2D volume-rendered image based on a single control input through a user interface device, adjust the first light type based on a second control input through the user interface device, and calculate an updated shading after adjusting the respective position of both the first light source and the second light source and after adjusting the first light type; and
display the 2D volume-rendered image with the updated shading on the display device.

11. The system of claim 10, wherein the processor is additionally configured to adjust the position of the first light source independently of the second light source and the third light source.

12. The system of claim 10, wherein the processor is configured to adjust the position of the first light source in parallel with the second light source and the third light source based on the single control input through the user interface device, and wherein the first light type, the second light type, and the third light type are each selected from a list of light types comprising a spot light, a point light, a parallel light, and an area light.

13. The system of claim 12, wherein the processor is configured to display a light navigator on the display device, the light navigator including a scaled volume-rendering of the 2D volume-rendered image, a first light direction indicator, a second light direction indicator, and a third light direction indicator, the first light direction indicator representing a position of the first light source and including a first light beam representing the first light type, the second light direction indicator representing a position of the second light source and including a second light beam representing the second light type, and the third light direction indicator representing a position of the third light source, and wherein after the adjusting of the first light type, the displayed first light beam is adjusted.

14. The system of claim 10, wherein the processor is configured to adjust the position of the first light source in lock-step with the position of the second light source to maintain a fixed relative positioning between the first light source and the second light source.

15. The system of claim 13, wherein the processor is configured to adjust the position of the first light source, the position of the second light source, and the position of the third light source in lock-step to maintain a fixed relative positioning between the first light source, the second light source, and the third light source, and wherein a size of the first light direction indicator is adjusted responsive to a third control input adjusting an intensity of the first light source.

16. A medical imaging device comprising:
an acquisition subsystem;

a display device;
a memory;
a user input; and
a processor communicatively connected to the acquisition subsystem, the display device, the memory, and the user input, wherein the processor is configured to:
control the acquisition subsystem to acquire a 3D medical imaging dataset;
generate a volume-rendered image from the 3D medical imaging dataset from a view direction, where generating the volume-rendered image comprises calculating a shading based on a first light source, a second light source, and a third light source, where the second light source and the third light source are both distinct from the first light source;
display the volume-rendered image on the display device;
display a light navigator on the display device, the light navigator including a model of a solid, a scaled volume-rendering of the volume-rendered image, a first light direction indicator, a second light direction indicator, and a third light direction indicator, the first light direction indicator representing a position of the first light source, the second light direction indicator representing a position of the second light source, and the third light direction indicator representing a position of the third light source;
receive a single control input adjusting a position of the first light direction indicator, the second light direction indicator, or the third light direction indicator;
adjust a position of both the first light source and the second light source based on the single control input;
generate an updated volume-rendered image from the view direction including adjusted shading based on the adjusted first light source, the adjusted second light source, and the third light source; and
display the updated volume-rendered image on the display device after adjusting the position of both the first light source and the second light source.

17. The medical imaging device of claim 16, wherein the medical imaging device comprises an ultrasound imaging system and the processor is configured to display the volume-rendered image on the display device in real-time.

18. The medical imaging device of claim 16, wherein the first light direction indicator, the second light direction indicator, and the third light direction indicator are positioned with respect to the model of the solid, and wherein the light navigator further includes a first highlight illustrating a first area of reflectivity on the model of the solid due to illumination of the model of the solid from the first light direction indicator, a second highlight illustrating a second area of reflectivity on the model of the solid due to illumination of the model of the solid from the second light direction indicator, and a third highlight illustrating a third area of reflectivity on the model of the solid due to illumination of the model of the solid from the third light direction indicator.

19. The medical imaging device of claim 16, wherein the processor is configured to adjust the position of the first light source in lock-step with the position of the second light source to maintain a fixed relative positioning between the first light source and the second light source, and wherein the processor is further configured to adjust shading of the scaled volume-rendering of the volume-rendered image after adjusting the position of both the first light source and the second light source.

20. The medical imaging device of claim 16, wherein the processor is configured to adjust the position of the first light source, the position of the second light source, and the position of the third light source in lock-step to maintain a fixed relative positioning between the first light source, the second light source, and the third light source.

* * * * *